(12) United States Patent
Ikeya et al.

(10) Patent No.: US 9,323,006 B2
(45) Date of Patent: Apr. 26, 2016

(54) OPTICAL CONNECTOR

(71) Applicant: YAZAKI CORPORATION, Tokyo (JP)

(72) Inventors: Kenichi Ikeya, Shizuoka (JP);
Tomohiro Hikosaka, Shizuoka (JP);
Keigo Tsubo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/619,223

(22) Filed: Feb. 11, 2015

(65) Prior Publication Data

US 2015/0177464 A1 Jun. 25, 2015

Related U.S. Application Data

(63) Continuation of application No. PCT/JP2013/073702, filed on Sep. 3, 2013.

(30) Foreign Application Priority Data

Sep. 4, 2012 (JP) ................................. 2012-194483

(51) Int. Cl.
*G02B 6/36* (2006.01)
*G02B 6/38* (2006.01)

(52) U.S. Cl.
CPC ............ *G02B 6/3826* (2013.01); *G02B 6/3829* (2013.01); *G02B 6/387* (2013.01); *G02B 6/3869* (2013.01); *G02B 6/3878* (2013.01); *G02B 6/3887* (2013.01)

(58) Field of Classification Search
CPC ... G02B 6/3887; G02B 6/3829; G02B 6/3826
See application file for complete search history.

(56) References Cited

U.S. PATENT DOCUMENTS

| 5,980,118 | A | | 11/1999 | Henningsson et al. | |
|---|---|---|---|---|---|
| 6,000,956 | A | * | 12/1999 | Henningsson | G02B 6/3869 361/799 |
| 6,072,613 | A | * | 6/2000 | Henningsson | G02B 6/4277 361/748 |
| 6,130,983 | A | * | 10/2000 | Cheng | G02B 6/3829 385/136 |
| 6,935,790 | B2 | * | 8/2005 | Ozaki | G02B 6/3879 385/136 |
| 6,962,504 | B2 | * | 11/2005 | Fukui | H01R 13/567 439/466 |
| 7,621,676 | B2 | * | 11/2009 | Nakagawa | G02B 6/4292 385/55 |
| 2002/0168151 | A1 | * | 11/2002 | Murayama | G02B 6/3887 385/86 |
| 2010/0284656 | A1 | * | 11/2010 | Morra | G02B 6/3829 385/78 |

(Continued)

FOREIGN PATENT DOCUMENTS

| EP | 1170608 A2 * | 1/2002 | ........... G02B 6/3829 |
|---|---|---|---|
| JP | H11-511266 A | 9/1999 | |
| JP | 2008-233450 A | 10/2008 | |
| JP | 2012-027090 A | 2/2012 | |

OTHER PUBLICATIONS

International Search Report and Written Opinion for PCT/JP2013/073702 dated Oct. 1, 2013.

(Continued)

*Primary Examiner* — Rhonda Peace
(74) *Attorney, Agent, or Firm* — Kenealy Vaidya LLP

(57) ABSTRACT

A protector is fixed to a housing in a state where a ferrule on which the protector is mounted is accommodated in a ferrule accommodation space of the housing, and thus a release of a locking state by a locking window and a fixing hook is regulated.

7 Claims, 9 Drawing Sheets

(56) References Cited

U.S. PATENT DOCUMENTS

2013/0101258 A1* 4/2013 Hikosaka ............. G02B 6/3829
  385/78
2015/0177464 A1* 6/2015 Ikeya .................. G02B 6/3826
  385/78

OTHER PUBLICATIONS

International Preliminary Report on Patentability and English language Written Opinion of the International Search Report for PCT/JP2013/073702.

* cited by examiner

OPTICAL CONNECTOR

CROSS REFERENCE TO RELATED APPLICATIONS

This application is a continuation of international patent application No. PCT/JP2013/073702, which was filed on Sep. 3, 2013 based on Japanese Patent Application No. 2012-194483 filed on Sep. 4, 2012, the contents of which are incorporated herein by reference.

BACKGROUND OF THE INVENTION

1. Field of the Invention

The present invention is related to an optical connector, for example, used in an optical fiber communication system which is mounted in a vehicle such as an automobile.

2. Description of the Related Art

In order to reduce the number of circuits which are used in communication and to suppress noise, mounting an optical fiber communication system in a vehicle such as an automobile has been studied. As the optical fiber communication system, an optical connector is used, which is provided with a ferrule to which an end portion of an optical fiber is connected, and a protector which is mounted on the ferrule and holds the optical fiber. This optical connector is known to have a configuration in that the protector has a bend-shaped wiring path which accommodates the optical fiber drawn from the ferrule and the protector is joined to an optical receptacle, thereby enabling the optical communication (refer to JP-A-2012-27090).

In addition, as the optical connector, a hinge-type right angle bend connector is known. The hinge-type right angle bend connector includes a ferrule which is fixed to a tip end of an optical cable, bending movable means capable of accommodating a bending portion of the optical cable, and a plug frame which covers the ferrule and the bending movable means, and a hinge base configuring the bending movable means is fitted into a stop ring (refer to JP-A-2008-233450).

SUMMARY OF THE INVENTION

Incidentally, in the optical connector disclosed in JP-A-2012-27090, when the vehicle is traveling, if an external force such as a vibration and an impact is applied to the protector which accommodates the bending portion of the optical fiber, there is a concern in that the ferrule is detached from the optical receptacle, thereby invoking poor optical communication. Similarly, in an optical connector disclosed in JP-A-2008-233450, when the vehicle is traveling, if an external force such as a vibration and an impact is applied to the bending movable means for accommodating the bending portion of the optical fiber, there is a concern in that the ferrule is detached from the plug frame, thereby invoking poor optical communication.

The present invention was made in consideration of the above described circumstances, and an object of the present invention is to provide an optical connector capable of reliably protecting the bending portion of the optical fiber and of maintaining satisfactory optical communication even when the external force is applied to the optical connector.

In order to accomplish the above-described object, an optical connector according to the present invention is characterized in the followings (1) and (2).

(1) An optical connector including:
a ferrule that is fixed to a tip end of an optical fiber;
a protector that is mounted on the ferrule and includes a bend-shaped wiring path for accommodating the optical fiber drawn from the ferrule;
a housing that has a tip end side which serves as a connecting portion to a mating connector and that includes a ferrule accommodation space on a base end side thereof, which accommodates the ferrule and a portion of the protector;
a holder that is mounted on the housing, positions the ferrule in the ferrule accommodation space, and regulates a movement of the ferrule in the ferrule accommodation space; and
a locking unit that is provided in the housing and the holder in order to mount the holder on the housing, wherein
the protector is fixed to the housing in a state where the holder is mounted on the holder by the locking unit and the ferrule on which the protector is mounted is accommodated in the ferrule accommodation space, thereby regulating a release of a locking state by the locking unit.

(2) The optical connector according to the configuration (1), wherein
the locking unit includes a locking window that is formed in the housing and a fixing hook that is formed in the holder and that includes a hook portion which enters the locking window and is locked to an edge portion of the locking window, and
when the protector is fixed to the housing, the protector is disposed on an opposite side of a projecting direction of the hook portion with respect to the fixing hook, and a gap dimension between the protector and the fixing hook is smaller than a locking dimension of a locking margin between the hook portion and the edge portion of the locking window, thereby regulating the release of the locking state by the locking unit.

In the above described configuration (1), an optical connector is capable of enabling wiring to a narrow space by holding an optical fiber in a bent shape by a protector and of reliably protecting a bending portion of the optical fiber. In addition, by fixing the protector to a housing, it is possible to regulate a release of a locking state of a holder which regulates the positioning and moving of a ferrule (prevents the ferrule from being dropped off) with respect to the housing. Accordingly, it is possible to reliably prevent the poor optical communication caused by the ferrule from being detached due to the vibration or the impact.

In the above described configuration (2), an optical connector allows the protector to be disposed on the side opposite to a projecting direction of a hook portion with respect to a fixing hook, and a gap dimension between the protector and the fixing hook to be smaller than a locking dimension of a locking margin between the hook portion and an edge portion of a locking window by fixing the protector to the housing. Accordingly, it is possible to prevent the detachment of the hook portion from the edge portion of the locking window and thus the release of the locking state of the holder which performs the positioning of the ferrule and preventing the ferrule from being dropped off is easily and reliably regulated with respect to the housing, thereby preventing the dropping-off of the holder.

According to the present invention, it is possible to provide an optical connector capable of maintaining the satisfactory optical communication, even if it is receiving the external force, while reliably protecting the bending portion of the optical fiber.

As described above, the description of the present invention is briefly made. Further, details of the present invention will be clarified more by reading the following "description of embodiment" with reference to the drawings.

DETAILED DESCRIPTION OF THE EXEMPLARY EMBODIMENTS

Hereinafter, examples of the present embodiment according to the present invention will be described in detail with reference to the drawings.

Figure 1:
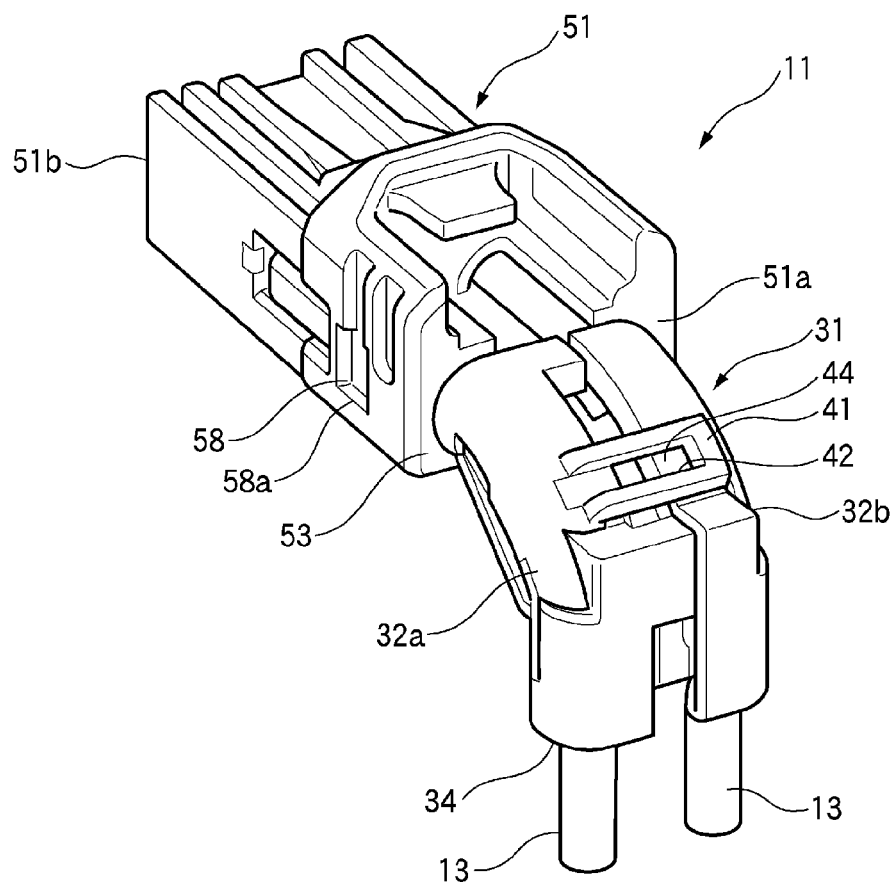
FIG. 1 is a perspective view of an optical connector according to the present embodiment.
Figure 2:
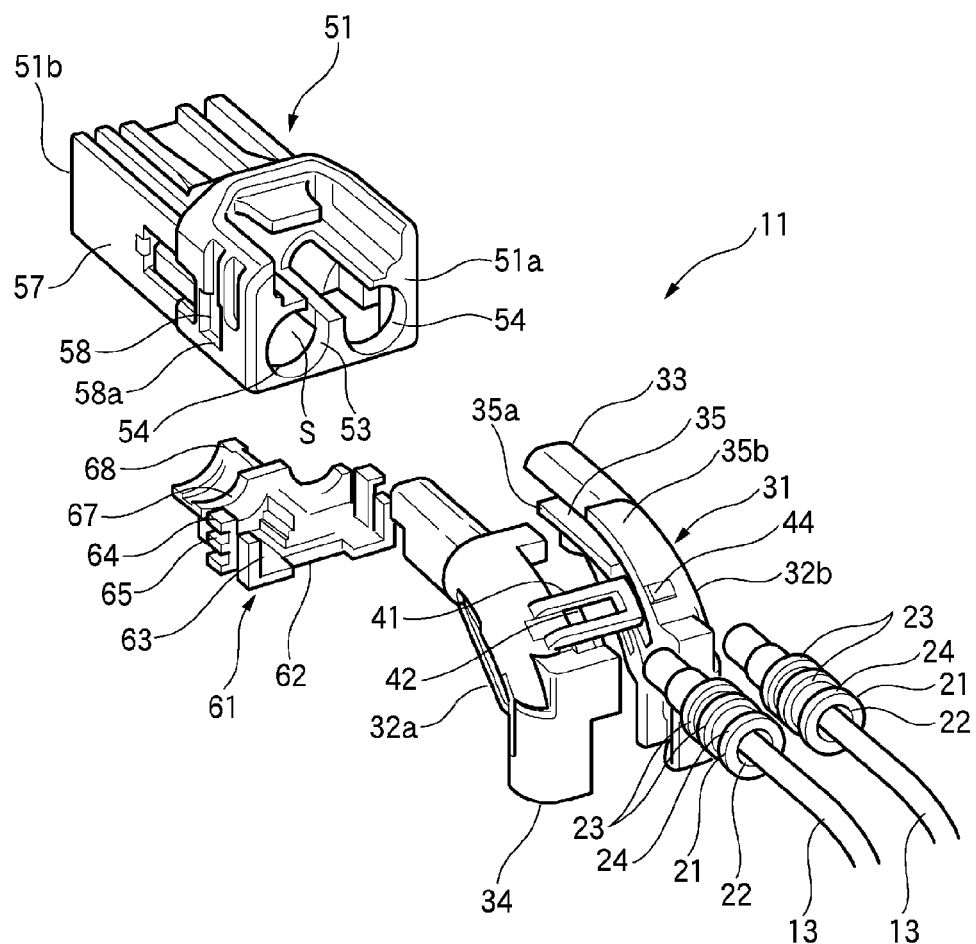
FIG. 2 is an exploded perspective view of the optical connector according to the present embodiment.
Figure 3:
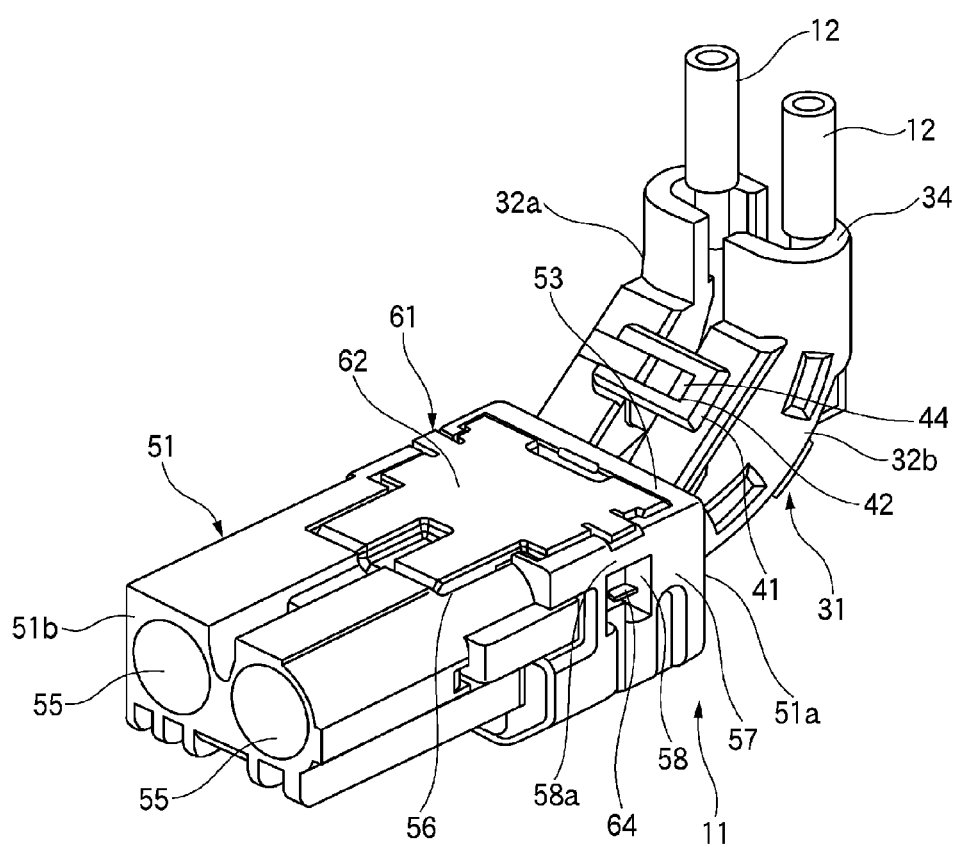
FIG. 3 is a perspective view of the optical connector according to the present embodiment when viewed from the rear side.
Figure 4:
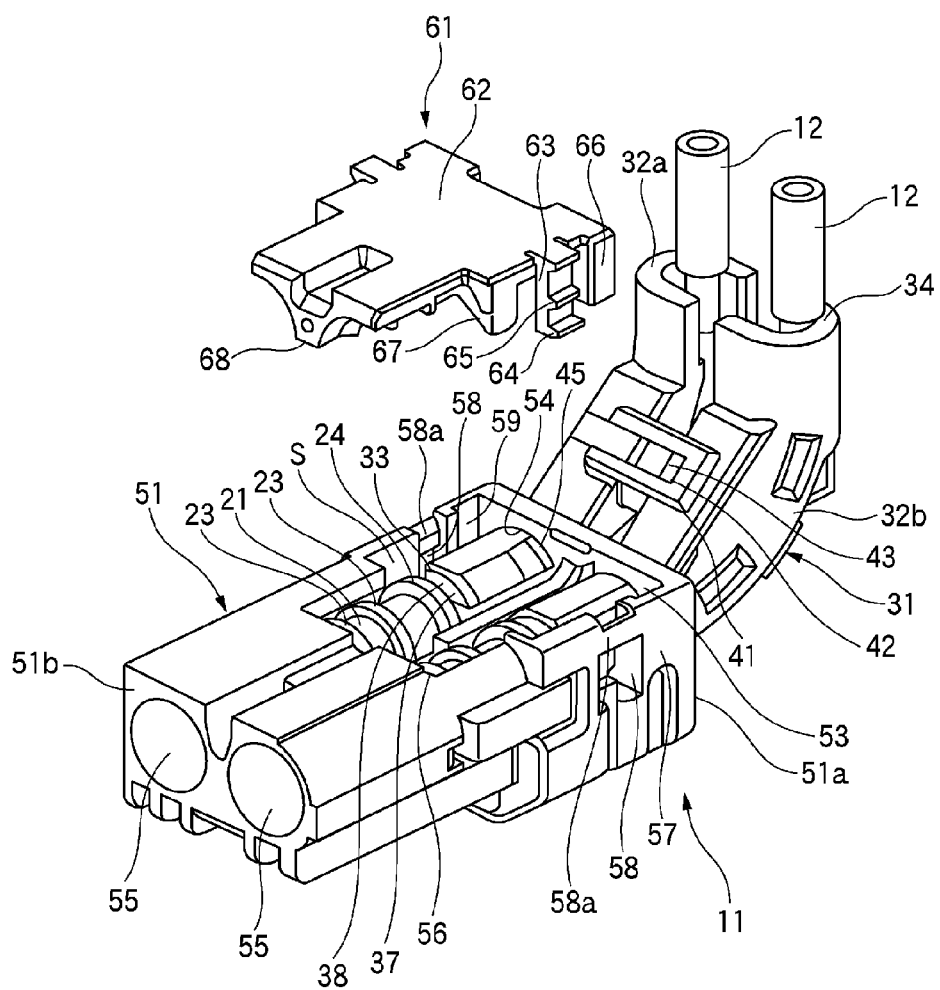
FIG. 4 is a perspective view of the optical connector having a holder removed according to the present embodiment when viewed from the rear side.
Figure 5:
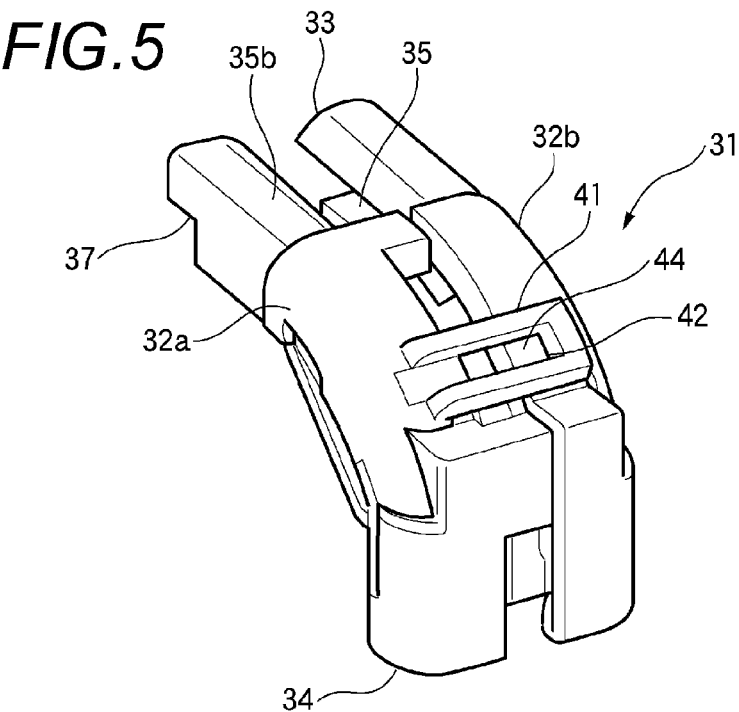
FIG. 5 is a perspective view of a protector configuring the optical connector.
Figure 6:
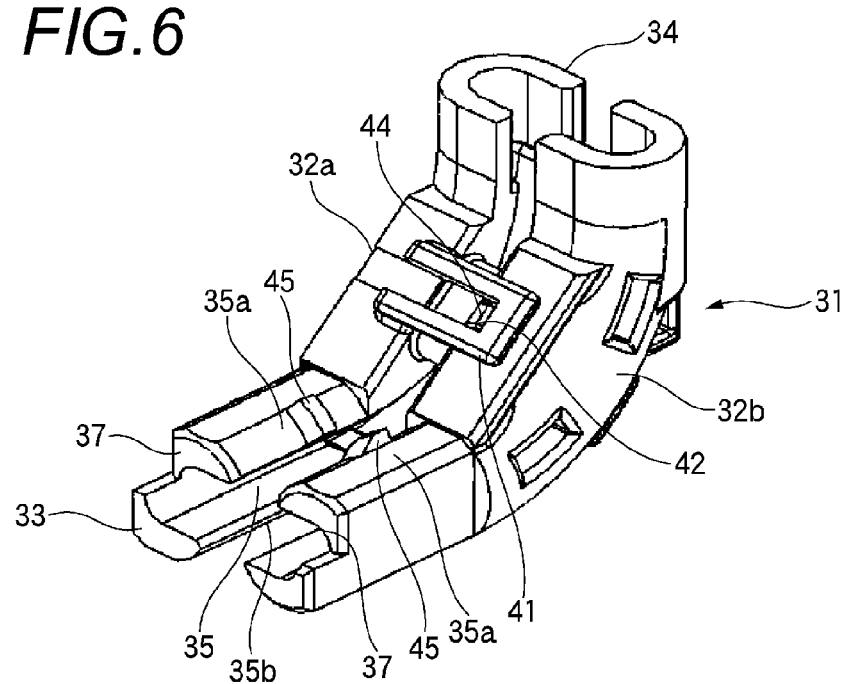
FIG. 6 is a perspective view of the protector configuring the optical connector when viewed from the rear side.
Figure 7:
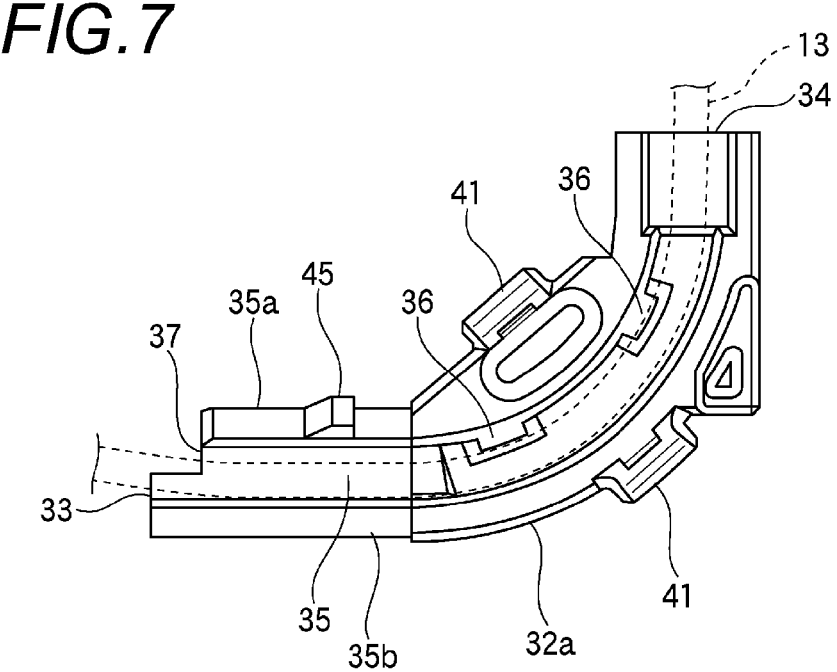
FIG. 7 is a side view of a protector division body of the protector configuring the optical connector.
Figure 8:
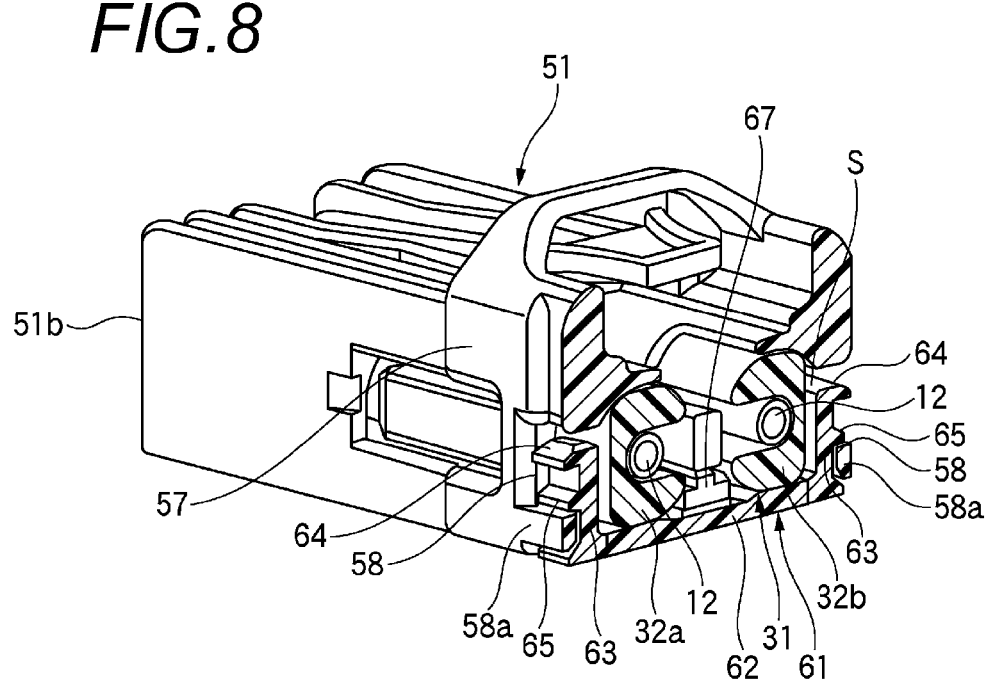
FIG. 8 is a perspective view illustrating a housing of the optical connector seen from the cross section on the base end side of the housing.
Figure 9:
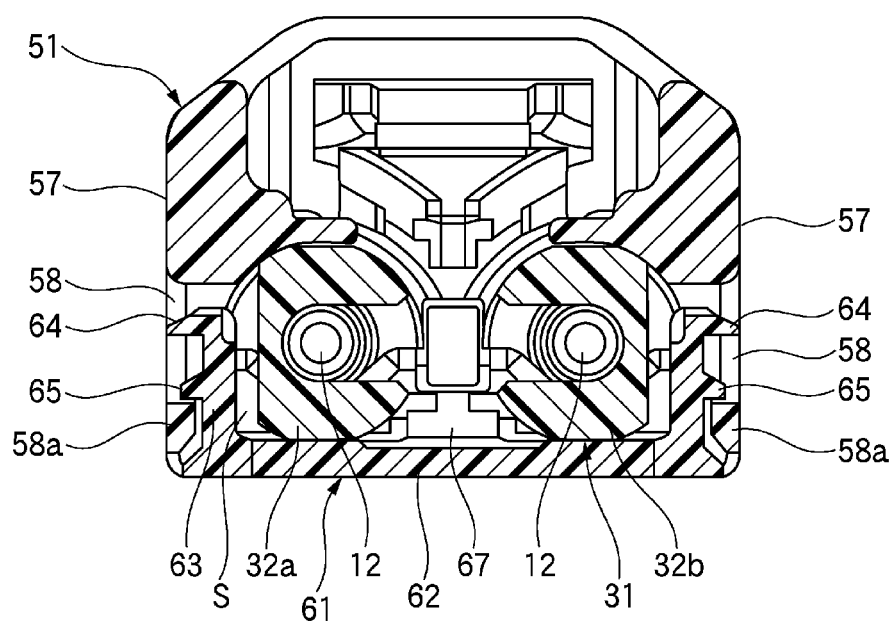
FIG. 9 is a cross-sectional view of the base end side of the housing in the optical connector.
Figure 10A:
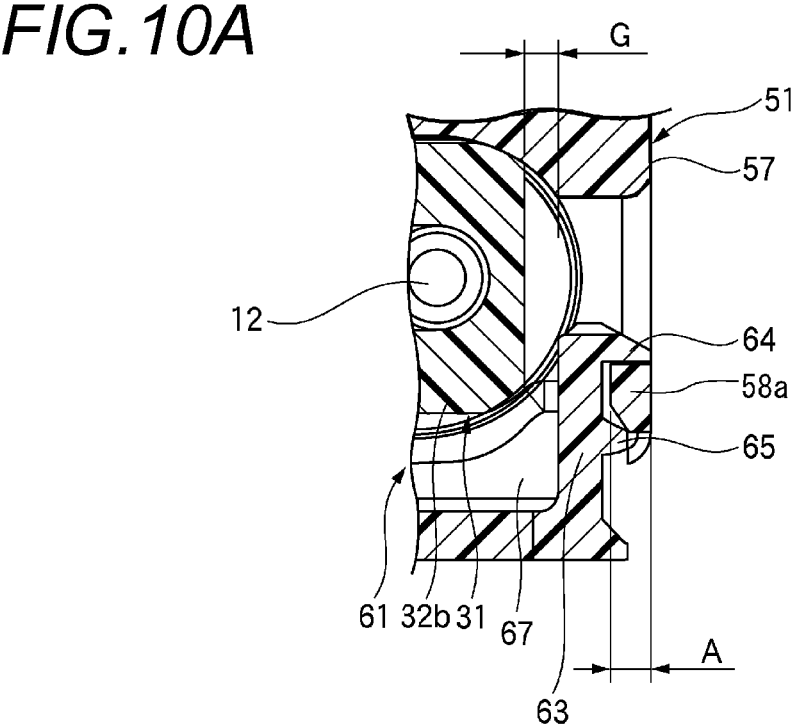
FIG. 10A is an expanded cross-sectional view of the base end side of the housing in the optical connector at the time of the temporary locking.
Figure 10B:
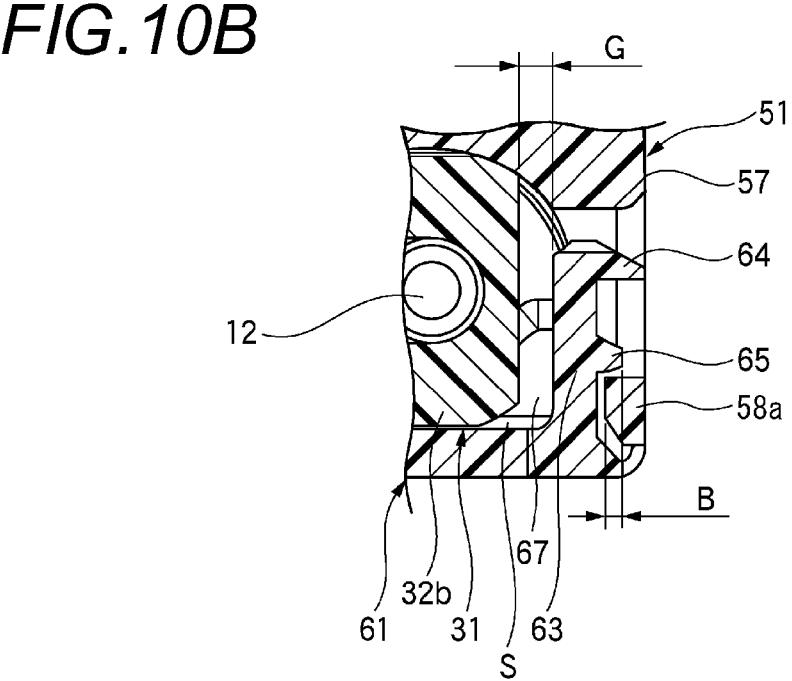
FIG. 10B is an expanded cross-sectional view of the base end side of the housing in the optical connector at the time of the complete locking.
Figure 11:
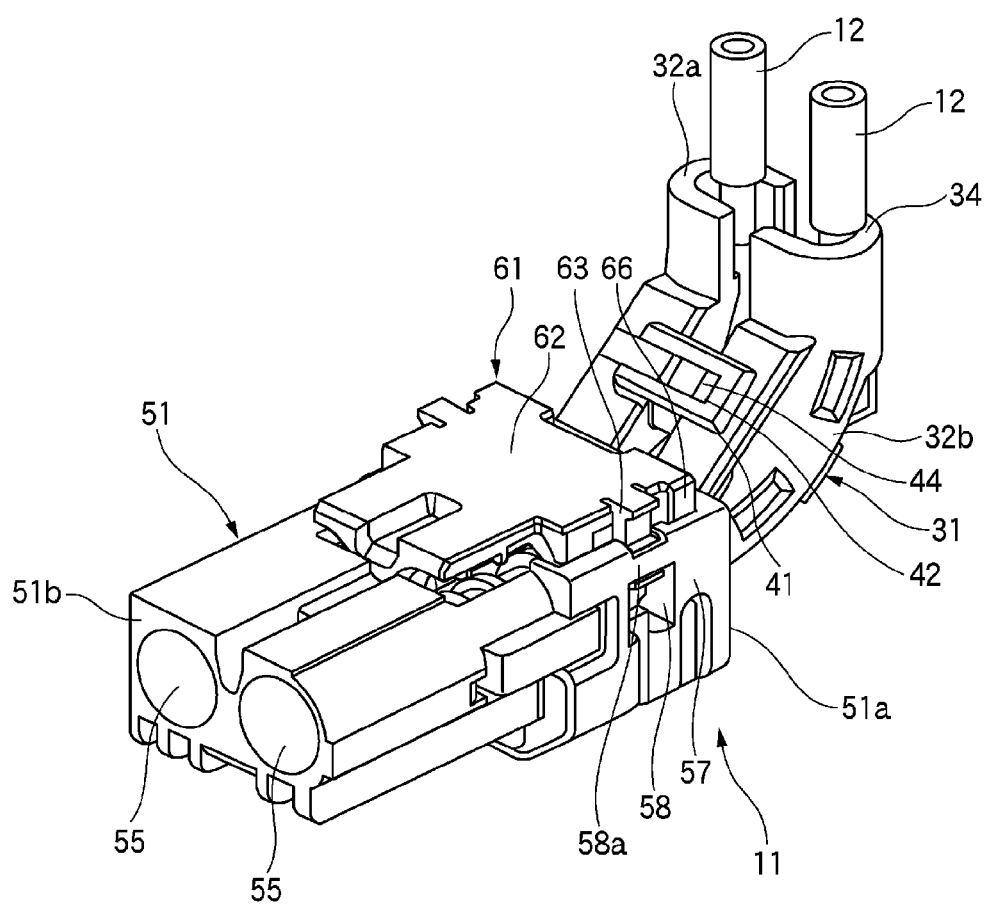
FIG. 11 is a perspective view of the optical connector according to the present embodiment when viewed from the rear side at the time of the temporary locking.

FIG. 1 is a perspective view of an optical connector according to the present embodiment, FIG. 2 is an exploded perspective view of the optical connector according to the present embodiment, FIG. 3 is a perspective view of the optical connector according to the present embodiment when viewed from the rear side, FIG. 4 is a perspective view of the optical connector having a holder removed according to the present embodiment when viewed from the rear side, FIG. 5 is a perspective view of a protector configuring the optical connector, FIG. 6 is a perspective view of the protector configuring the optical connector when viewed from the rear side, FIG. 7 is a side view of a protector division body of the protector configuring the optical connector, FIG. 8 is a perspective view illustrating a housing of the optical connector seen from the cross section on the base end side of the housing, FIG. 9 is a cross-sectional view of the base end side of the housing in the optical connector, FIG. 10A and FIG. 10B are expanded cross-sectional views of the base end side of the housing in the optical connector. FIG. 11 is a perspective view of the optical connector according to the present embodiment when viewed from the rear side at the time of the temporary locking.

As illustrated in FIG. 1 to FIG. 4, an optical connector 11 is connected to an end portion of an optical fiber cord 13 including an optical fiber. The optical fiber cord 13 configures, for example, a signal line in an optical fiber communication system which is mounted in a vehicle such as an automobile. The optical fiber cord 13 is configured such that the outer periphery of the optical fiber including a core and a clad is covered. The optical connector 11 is connected to a mating connector (not shown) which is a counterpart of a communication system. Therefore, it is possible to perform the optical communication between an end surface of the optical fiber of the optical fiber cord 13 and a light receiving and emitting unit (not shown) provided in the mating connector.

The optical fiber cord 13 of which the vicinity of the end portion is bent is directed to the optical connector 11. Accordingly, the optical fiber cord 13 is capable of enabling the wiring in a narrow rail space in a vehicle.

The optical connector 11 includes a ferrule 21, a protector 31, a housing 51, and a holder 61 as illustrated in FIG. 2.

The ferrule 21, which includes a fiber inserting hole 22 in a center portion thereof, is formed in a cylindrical shape, and the end portion of the optical fiber cord 13 is inserted into the fiber inserting hole 22 and fixed to the fiber inserting hole 22. A pair of positioning flange portions 23 are formed in a lateral surface of this ferrule 21. In addition, a locking flange portion 24 is formed in a rear end of this ferrule 21. The pair of positioning flange portions 23 and the locking flange portion 24 is formed in a protrusion shape along the peripheral direction of the ferrule 21.

The optical fiber cord 13 is fixed in a state where the end portion thereof is inserted into the fiber inserting hole 22 of the ferrule 21 to be positioned. Note that as a method of fixing the optical fiber cord 13 to the ferrule 21, an adhesion by using an adhesive is exemplified. Meanwhile, the present invention is not limited to a technique of fixing the optical fiber cord 13 to the ferrule 21 by using the adhesive.

As illustrated in FIG. 5 to FIG. 7, the protector 31 of the optical connector 11 is provided with protector division bodies 32a and 32b, each of which is a portion of a half protector. The protector division bodies 32a and 32b are formed by a synthetic resin and are formed into a circular curved shape as a whole. One end side of the protector division bodies 32a and 32b is set to be a connection end 33 in which the ferrule 21 is disposed and the other end side of the protector division bodies 32a and 32b is set to a drawing end 34 from which the optical fiber cord 13 is drawn.

In the protector division bodies 32a and 32b which are assembled to each other, a bend-shaped wiring path 35 is formed therein along the shape of the protector division bodies 32a and 32b. The optical fiber cord 13 which is drawn from the ferrule 21 is accommodated in this wiring path 35. The optical fiber cord 13 which is accommodated in the wiring path 35 is guided along the wiring path 35 and formed into the bend shape, and drawn from the drawing end 34 of the protector 31. The wiring path 35 is formed into the bend shape in a radius of equal to or greater than the minimum allowable bending radius of the optical fiber cord 13.

The description of a structure of the protector division bodies 32a and 32b will be made in detail. A portion of the wiring path 35 which is provided in each of the protector division bodies 32a and 32b is formed between an inner peripheral wall 35a and an outer peripheral wall 35b which form the peripheral walls of the protector division bodies 32a and 32b. The inner peripheral wall 35a is a portion which is positioned on the middle portion of the peripheral walls of the protector division bodies 32a and 32b, and an outer peripheral wall 35b is a portion which is positioned on the back side of the peripheral walls of the protector division bodies 32a and 32b. A portion of the wiring path 35 of each of the protector division bodies 32a and 32b is a space which is sandwiched between the inner peripheral wall 35a and the outer peripheral wall 35b which face each other, and this space is opened to the lateral side of each of the protector division bodies 32a and 32b before the protector division bodies 32a and 32b are assembled to each other (refer to FIG. 7). In this manner, the portion of the wiring path 35 is configured to be accommodated by inserting the optical fiber cord 13 from the lateral side of each of the protector division bodies 32a and 32b.

As illustrated in FIG. 7, in a portion of the wiring path 35 of each of the protector division bodies 32a and 32b, a cord locking hook 36 which is projected to the outer peripheral wall 35b side is formed at the end portion of the inner peripheral wall 35a which is positioned on the lateral side of each of the protector division bodies 32a and 32b. Due to this cord locking hook 36, the optical fiber cord 13 which is accommodated in a portion of the wiring path 35 is locked. In this manner, the optical fiber cord 13 is held in a portion of the wiring path 35, and thus the optical fiber cord 13 is prevented from protruding from the portion of the wiring path 35.

In addition, in each of the protector division bodies 32a and 32b, a notched portion 37 is formed on the connection end 33 side. The notched portion 37 is formed such that the outer peripheral wall 35b extends longer than the inner peripheral wall 35a to the connection end 33 side. With this configuration, when the optical fiber cord 13 is accommodated in the wiring path 35 and the ferrule 21 is disposed in the connection end 33 of the protector division bodies 32a and 32b, a rear end surface of the ferrule 21 abuts an end surface of the outer peripheral wall 35b and is separated from an end surface of the inner peripheral wall 35a. In this manner, the rear end surface of the ferrule 21 and the notched portion 37 of the protector division bodies 32a and 32b form a locking hole 38.

In one side of the protector division body 32a, a locking piece 41, which projects to the other side of protector division body 32b, is formed on the outer surface side of each of the inner peripheral wall 35a and the outer peripheral wall 35b (refer to FIG. 5 to FIG. 7). A locking hole 42 is formed in the locking piece 41. In addition, in the other side of the protector division body 32b, a locking hook 44 is formed on the outer surface side of each of the inner peripheral wall 35a and the outer peripheral wall 35b (refer to FIG. 5 and FIG. 6).

These protector division bodies 32a and 32b allow the lateral sides of the protector division bodies 32a and 32b to face each other, and thereby the locking hook 44 enters the locking hole 42 of the locking piece 41. In this manner, when the protector division bodies 32a and 32b are integrally formed by combining with each other, the lateral sides of the protector division bodies 32a and 32b are blocked, and thus the wiring path 35 is formed.

In addition, in each of the protector division bodies 32a and 32b of the protector 31, a retaining hook 45 which projects from the outer surface side of the inner peripheral wall 35a is formed in the vicinity of the connection end 33 in the inner peripheral wall 35a.

A housing 51 and a holder 61 are formed by using synthetic resin materials, and the holder 61 is mounted with respect to the housing 51.

The base end side of the housing 51 is set to a mounting end 51a on which the protector 31 is mounted, and an insertion hole 54 into which the ferrule 21 and the connection end 33 of the protector 31 are inserted is formed in an end surface substrate 53 which is positioned on the mounting end 51a side. Then, when the ferrule 21 and the connection end 33 of the protector 31 are inserted into the insertion hole 54 of the housing 51, the retaining hook 45 which is formed in each of the protector division bodies 32a and 32b passes through the insertion hole 54 and locks the edge portion of the insertion hole 54 (refer to FIG. 4). Further, in the housing 51, the tip end side which is the opposite side of the mounting end 51a serves as a connecting portion 51b, and this connecting portion 51b is connected to the other connector. The connecting portion 51b includes a pair of through holes 55 which penetrate in the front-back direction, and a tip end portion of the ferrule 21 which is inserted from the mounting end 51a is inserted into the through hole 55.

In the housing 51, a ferrule accommodation space S is formed on the mounting end 51a side. The ferrule 21 inserted from the mounting end 51a and the connection end 33 of the protector 31 are accommodated in this ferrule accommodation space S.

In the mounting end 51a side of the housing 51, an opening portion 56 is formed on the one surface thereof, and the holder 61 is mounted on this opening portion 56 (refer to FIG. 3 and FIG. 4). The ferrule 21 and the connection end 33 of the protector 31, which are inserted into the insertion hole 54 and accommodated in the ferrule accommodation space S, are exposed from this opening portion 56.

In addition, in a side wall 57 configuring the housing 51, a locking window (locking unit) 58 and a slide groove 59 are formed in an inner surface facing the inside of the housing 51. The slide groove 59 is configured to be drilled in the inner surface of the side wall 57 along the direction in which the holder 61 is mounted on the opening portion 56.

The holder 61, which is mounted on the opening portion 56 of the housing 51, includes a holder board portion 62 which is formed in almost the same planar shape as the opening portion 56 of the housing 51. In both side portions of the holder board portion 62, a fixing hook (locking unit) 63 extends in the direction in which the holder 61 is mounted on the opening portion 56. The fixing hook 63 includes a temporary hook portion (a hook portion) 64 and a complete hook portion (a hook portion) 65 which project to the outside of the holder board portion 62. The temporary hook portion 64 is disposed at the tip end of the fixing hook 63, and the complete hook portion 65 is formed on the holder board portion 62 from the temporary hook portion 64. The temporary hook portion 64 has the projecting dimension from the fixing hook 63 slightly larger than that of the complete hook portion 65.

In addition, by fitting the holder 61 into the opening portion 56 of the housing 51, the temporary hook portion 64 and the complete hook portion 65 of the fixing hook 63 enter the locking window 58 of the side wall 57 of the housing 51, and thus are sequentially locked to the edge portion 58a forming the locking window 58.

As illustrated in FIG. 8 and FIG. 9, in a state where the protector 31 and the holder 61 are mounted on the housing 51, the protector 31 is disposed on the opposite side of the projecting direction of the temporary hook portion 64 and the complete hook portion 65 with respect to the fixing hook 63, in other words, between two fixing hooks 63 which face the projecting direction of the temporary hook portion 64 and the complete hook portion 65.

Then, in this state, as illustrated in FIG. 10A, a gap dimension G between the protector 31 and the fixing hook 63 becomes smaller than a locking dimension A of a locking margin in which the temporary hook portion 64 is locked to the edge portion 58a of the locking window 58. Accordingly, even when the fixing hook 63 is to be bent and displaced beyond the locking dimension A, the displacement beyond the locking dimension A is regulated due to the protector 31 which comes into contact with the gap dimension G. For this reason, the temporary hook portion 64 is necessarily locked to the edge portion 58a. Accordingly, in a state where the holder 61 performing the positioning and the retaining of the ferrule 21 is locked with respect to the housing 51, it is possible to regulate the aforementioned state being released. In addition, as illustrated in FIG. 10B, the locking dimension B of the locking margin in which the complete hook portion 65 is locked to the edge portion 58a of the locking window 58 is set to be equal to or smaller than the gap dimension G between the fixing hook 63 and the protector 31.

In addition, a slide rail 66 extending along the mounting direction of the housing 51 is formed at a position in the vicinity of the fixing hook 63 in the holder board portion 62 of the holder 61.

In addition, in the holder board portion 62, when the holder 61 is mounted on the housing 51, a ferrule locking hook 67 and a ferrule holding protrusion 68 which project to the mounting direction of the housing 51 are formed on the surface facing the housing 51.

The ferrule locking hook 67 is disposed in the direction orthogonal to the direction of inserting the ferrule 21 with respect to the housing 51. By mounting the holder 61 on the housing 51, the ferrule 21 which is inserted into the housing 51 is locked, that is, the ferrule locking hook 67 enters the locking hole 38 and thus the rear end surface of the locking flange portion 24 is locked by the ferrule locking hook 67. Therefore, the ferrule 21 is positioned in the axial direction and the movement thereof in the axial direction is regulated and thus retained.

The ferrule holding protrusion 68 is disposed along the direction of inserting the protector 31 with respect to the housing 51. By mounting the holder 61 on the housing 51, the ferrule holding protrusion 68 enters between the pair of positioning flange portions 23 and between two ferrules 21 which are inserted into the housing 51. Thus, the ferrule 21 is held in the housing 51 in a state where the movement of the alignment direction of the ferrule 21 is regulated and thus positioned by the housing 51 and the ferrule holding protrusion 68 of the holder 61.

Next, a case of assembling the optical connector 11 will be described.

First, the optical fiber cord 13 in which the ferrule 21 is fixed to the end portion is accommodated in the wiring path 35 of the protector division bodies 32a and 32b. Then, the locking hook 44 is locked to the locking hole 42 of the locking piece 41 by allowing the lateral sides of the protector division bodies 32a and 32b to face each other. In this way, the optical fiber cord 13 is accommodated in the wiring path 35 of the protector 31 in a state of being bent in a radius of equal to or greater than the minimum allowable bending radius. Accordingly, the bending portion of the optical fiber cord 13 is protected by the protector 31 so as not to be bent in a radius of smaller than the minimum allowable bending radius.

Next, the ferrule 21 projecting from the connection end 33 of the protector 31 is inserted into the insertion hole 54 of the housing 51. At this time, as illustrated in FIG. 10A and FIG. 11, the temporary locking state is set in the housing 51 such that the holder 61 is fit into the opening portion 56 and the temporary hook portion 64 of the fixing hook 63 enters the locking window 58.

The ferrule 21 is inserted into a point at which the tip end portion thereof reaches a predetermined position of the through hole 55, and the connection end 33 of the protector 31 is inserted into the housing 51 via the insertion hole 54. In this way, the retaining hook 45 which is formed in the protector division bodies 32a and 32b of the protector 31 passes through the insertion hole 54 and enters the ferrule accommodation space S in the housing 51. Then, these retaining hooks 45 are locked to the edge portion of the insertion hole 54 in the end surface substrate 53 of the housing 51. Accordingly, the protector 31 is reliably fixed to the housing 51 by regulating the movement to the insertion direction with respect to the housing 51.

Further, in this state, the protector 31 is disposed on the opposite side of the projecting direction of the temporary hook portion 64 and the complete hook portion 65 in the fixing hook 63, and the gap dimension G between the protector 31 and the fixing hook 63 becomes smaller than a locking dimension A of a locking margin in which the temporary hook portion 64 is locked to the edge portion 58a of the locking window 58. Accordingly, even when the fixing hook 63 is to be bent and displaced beyond the locking dimension of A, the displacement beyond the locking dimension A is regulated due to the protector 31 which comes into contact with the gap dimension G. For this reason, the temporary hook portion 64 is necessarily locked to the edge portion 58a. Accordingly, in a state where the holder 61 performing the positioning and the retaining of the ferrule 21 is locked with respect to the housing 51, it is possible to regulate that the aforementioned state is released.

Thereafter, as illustrated in FIG. 3 and FIG. 10B, the holder 61 in the temporary locking state is inserted into the housing 51 side. Accordingly, the complete hook portion 65 of the fixing hook 63 in the holder 61 is set to be in the complete locking state of entering the locking window 58. At this time, the locking dimension B of the locking margin in which the complete hook portion 65 is locked to the edge portion 58a of the locking window 58 is equal to or smaller than the gap dimension G between the fixing hook 63 and the protector 31 of the optical connector 11. Therefore, the holder 61 is sufficiently inserted into the housing 51.

As such, when the holder 61 is inserted into the housing 51, and thus the complete locking state is set with respect to the housing 51, the ferrule locking hook 67 of the holder 61 enters the locking hole 38 and then is locked to the rear end surface of the locking flange portion 24 of the ferrule 21. Accordingly, the ferrule 21 is positioned to the axial direction and retained. In addition, the ferrule holding protrusion 68 enters between two ferrules 21, and thus the movement of the alignment direction of the ferrule 21 is regulated, thereby holding the ferrule 21 in the housing 51.

In addition, when mounting the holder 61 on the housing 51, the slide rail 66 of the holder 61 enters the slide groove 59 of the housing 51, and thereby the holder 61 is held with respect to the housing 51 in the width direction without rattling.

As described above, according to the optical connector 11 of the present embodiment, the protector 31 allows the optical fiber cord 13 to be held in the bend shape, thereby enabling the wiring to the narrow space and reliably protecting the bending portion of the optical fiber cord 13. Also, by fixing the protector 31 to the housing 51, it is possible to regulate the release of the locking state with respect to the housing 51 of the holder 61 performing the positioning and the retaining of the ferrule 21. Accordingly, it is possible to reliably prevent the poor optical communication caused by the ferrule 21 from being detached due to the vibration and the impact.

Specifically, the protector 31 is disposed on the side opposite to the temporary hook portion 64 and the complete hook portion 65 of the fixing hook 63 in the projecting direction, the gap dimension G between the protector 31 and the fixing hook 63 is to be smaller than the locking dimension A of the locking margin in which the temporary hook portion 64 is locked to the edge portion 58a of the locking window 58. Accordingly, even when the fixing hook 63 is to be bent and displaced beyond the locking dimension of A, the displacement beyond the locking dimension A is regulated due to the protector 31 which comes into contact with the gap dimension G. For this reason, the temporary hook portion 64 is necessarily locked to the edge portion 58a. Accordingly, in a state where the holder 61 performing the positioning and the retaining of the ferrule 21 is locked with respect to the housing 51, it is possible to regulate that the aforementioned state is released.

The optical connector 11 of the embodiment is capable of reliably protecting the bending portion of the optical fiber cord 13 and of maintaining the satisfactory optical communication even the external force is applied to the optical connector 11.

Meanwhile, in the above described embodiment, in a state in which the protector 31 is mounted on the housing 51, the gap dimension G between the protector 31 and the fixing hook 63 is configured to be smaller than the locking dimension A of the locking margin in which the temporary hook portion 64 is locked to the edge portion 58a of the locking window 58. The gap dimension G may be configured to be smaller than the locking dimension B of the locking margin in which the complete hook portion 65 is locked to the edge portion 58a of the locking window 58. In this manner, by mounting the protector 31 to the housing 51, it is possible to reliably maintain the state in which the holder 61 is completely locked to the housing 51. In this case, an assembling order of the optical connector 11 allows the holder 61 to be in the complete locking state in a state of incorporating the ferrule 21 to the housing 51, and thereafter, the protector 31 is fixed to the housing 51.

The present invention is not intended to be limited to the above embodiment, and suitable modifications, improvements, and the like are possible. Furthermore, regarding each component in the above-described embodiment, materials, shapes, sizes, numbers, arrangement positions, and the like are arbitrary and not limited as long as it can achieve the present invention.

Here, the characteristics of the embodiment of an optical connector according to the present invention described above are briefly summarized and listed in the following respective descriptions [1] and [2].

[1] An optical connector including:
a ferrule (21) that is fixed to a tip end of an optical fiber (an optical fiber cord 13);
a protector (31) that is mounted on the ferrule and includes a bend-shaped wiring path for accommodating the optical fiber drawn from the ferrule;
a housing (51) that has a tip end side which serves as a connecting portion to a mating connector and that includes a ferrule accommodation space (S) on a base end side thereof, which accommodates the ferrule and a portion of the protector;
a holder (61) that is mounted on the housing, positions the ferrule in the ferrule accommodation space, and regulates a movement of the ferrule in the ferrule accommodation space; and
a locking unit (a fixing hook 63, a locking window 58) that is provided in the housing and the holder in order to mount the holder on the housing, wherein
the protector is fixed to the housing in a state where the holder is mounted on the holder by the locking unit and the ferrule on which the protector is mounted is accommodated in the ferrule accommodation space, thereby regulating a release of a locking state by the locking unit.

[2] The optical connector according to the configuration [1], wherein
the locking unit includes a locking window (58) that is formed in the housing and a fixing hook (63) that is formed in the holder and that includes a hook portion (a temporary hook portion 64 and a complete hook portion 65) which enters the locking window and is locked to an edge portion (58a) of the locking window, and when the protector is fixed to the housing, the protector is disposed on an opposite side of a projecting direction of the hook portion with respect to the fixing hook, and a gap dimension between the protector and the fixing hook is smaller than a locking dimension of a locking margin between the hook portion and the edge portion of the locking window, thereby regulating the release of the locking state by the locking unit.

While the present invention has been described with reference to details or specific embodiments, it is apparent to those skilled in the art that it is possible to make various changes and modifications without departing from the spirit and scope of the present invention.

An optical connector according to the present invention is capable of reliably protecting the bending portion of the optical fiber and of maintaining satisfactory optical communication even the external force is applied to the optical connector. The present invention achieving this effect is useful in the field of an optical connector used in an optical fiber communication system or the like in a vehicle such as an automobile.

What is claimed is:

1. An optical connector comprising:
a ferrule that is fixed to a tip end of an optical fiber;
a protector that is mounted on the ferrule and includes a bend-shaped wiring path for accommodating the optical fiber drawn from the ferrule;
a housing that has a tip end side which serves as a connecting portion to a mating connector and that includes a ferrule accommodation space on a base end side thereof, which accommodates the ferrule and a portion of the protector;
a holder that is mounted on the housing, positions the ferrule in the ferrule accommodation space, and regulates a movement of the ferrule in the ferrule accommodation space; and
a locking unit that is provided in the housing and the holder in order to mount the holder on the housing, wherein
the protector is fixed to the housing in a state where the holder is mounted on the housing by the locking unit and the ferrule on which the protector is mounted and the portion of the protector are accommodated in the ferrule accommodation space, thereby regulating a release of a locking state by the locking unit, and
when the protector is fixed to the housing, the protector is disposed on an opposite side of a portion of the locking unit of the holder, and a gap dimension between the protector and the portion of the locking unit on the holder is smaller than a locking dimension of a locking margin between the portion of the locking unit on the holder and a portion of the locking unit on the housing, thereby regulating the release of the locking state by the locking unit.

2. The optical connector according to claim 1, wherein
when the protector is fixed to the housing, the protector is disposed on an opposite side of a portion the lock unit of the holder, and a locking dimension of a locking margin between another portion of the locking unit on the holder and the portion of the locking unit on the housing is less than or equal to a gap dimension between the another portion of the locking unit on the holder and the portion of the locking unit on the housing, thereby regulating the release of the locking state by the locking unit.

3. The optical connector according to claim 1, wherein
the locking unit includes a temporary hook portion provided on the holder, a complete hook portion provided on the holder and spaced from the temporary hook portion, and a window provided on the housing,
the window includes an edge,
the holder includes a holder board portion,
the holder includes a temporary position where the temporary hook portion engages the edge of window, and the holder board portion is spaced away from the housing, and
the holder includes a complete position where the complete hook portion engages the edge of the window, and the holder board portion is substantially flush with the housing.

4. The optical connector according to claim 1, wherein
the housing includes a channel, and
the holder includes a slide rail that engages and slides along the channel as the holder is inserted onto the housing.

5. The optical connector according to claim 1, wherein
the holder includes a ferrule locking hook and a ferrule holding protrusion,
the ferrule locking hook engages a first portion of the ferrule, and
the holding protrusion engages a second portion of the ferrule that is spaced from the first portion.

6. The optical connector according to claim 1, wherein
the protector includes retaining hook on protector,
the housing includes an end surface substrate and an insertion hole in the end surface substrate, and
the hook engages the end surface substrate adjacent the insertion hole.

7. An optical connector comprising:
a ferrule that is fixed to a tip end of an optical fiber;
a protector that is mounted on the ferrule and includes a bend-shaped wiring path for accommodating the optical fiber drawn from the ferrule;
a housing that has a tip end side which serves as a connecting portion to a mating connector and that includes a ferrule accommodation space on a base end side thereof, which accommodates the ferrule and a portion of the protector;
a holder that is mounted on the housing, positions the ferrule in the ferrule accommodation space, and regulates a movement of the ferrule in the ferrule accommodation space; and
a locking unit that is provided in the housing and the holder in order to mount the holder on the housing, wherein
the protector is fixed to the housing in a state where the holder is mounted on the housing by the locking unit and the ferrule on which the protector is mounted and the portion of the protector are accommodated in the ferrule accommodation space, thereby regulating a release of a locking state by the locking unit, wherein
the locking unit includes a locking window that is formed in the housing and a fixing hook that is formed in the holder and that includes a hook portion which enters the locking window and is locked to an edge portion of the locking window, and
when the protector is fixed to the housing, the protector is disposed on an opposite side of a projecting direction of the hook portion with respect to the fixing hook, and a gap dimension between the protector and the fixing hook is smaller than a locking dimension of a locking margin between the hook portion and the edge portion of the locking window, thereby regulating the release of the locking state by the locking unit.

* * * * *